Nov. 9, 1954
T. O. ALLEN
2,693,856
WELL COMPLETION METHOD
Filed April 1, 1952
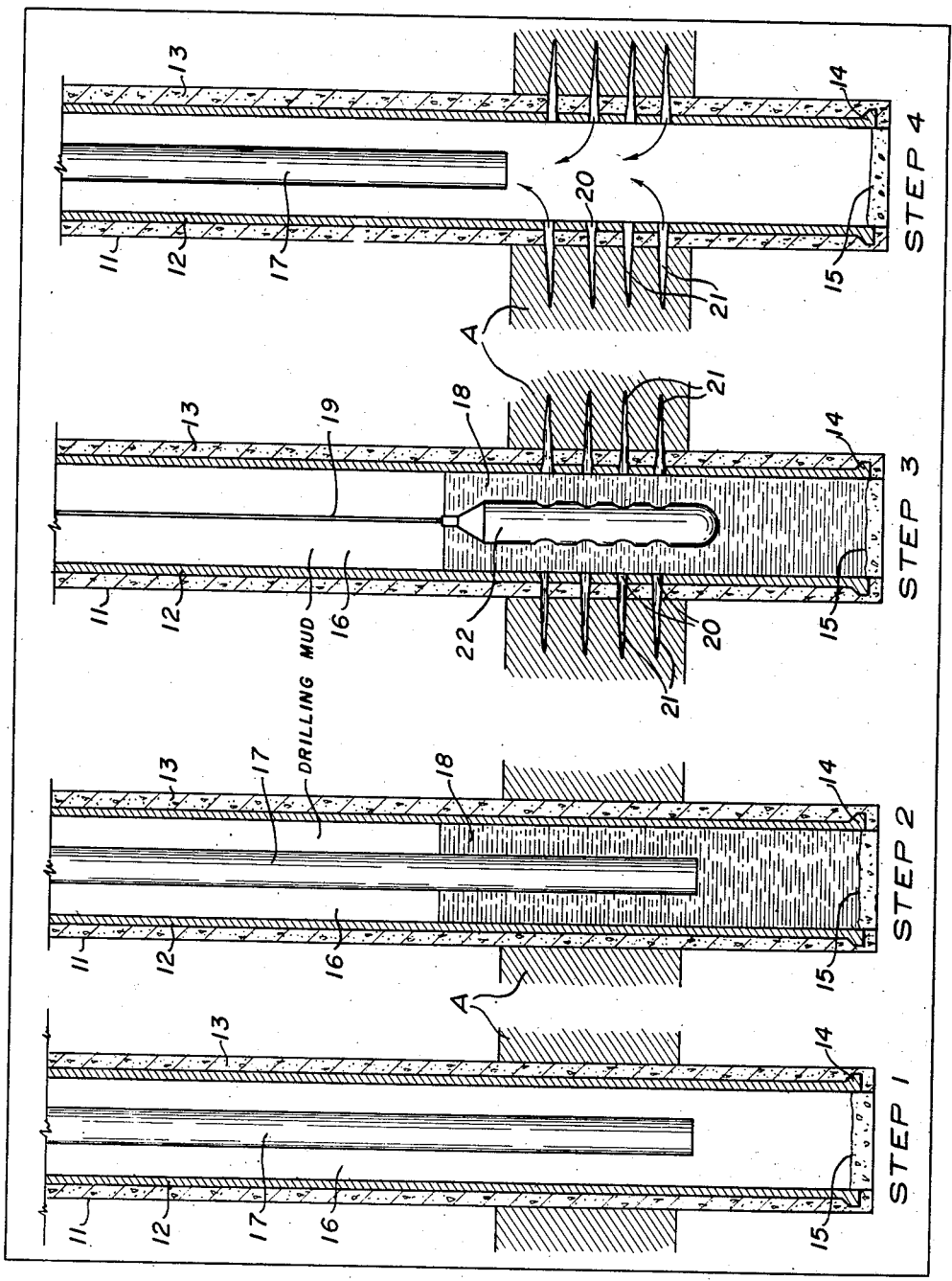
INVENTOR.
THOMAS O. ALLEN,
BY
AGENT.

United States Patent Office 2,693,856
Patented Nov. 9, 1954

2,693,856
WELL COMPLETION METHOD

Thomas O. Allen, Bellaire, Tex., assignor, by mesne assignments, to Standard Oil Development Company, Elizabeth, N. J., a corporation of Delaware Application April 1, 1952, Serial No. 279,732

10 Claims. (Cl. 166—23)

The present invention is directed to a method for completing oil and gas wells. More particularly, the invention is directed to a method for completing oil and gas wells in which a drilling fluid or mud is used to control the well. In its more particular aspects, the invention is directed to a method for completing an oil or gas well in which a column of drilling mud is maintained in a casing to control the well.

Current practice when completing wells, such as oil and gas wells, through perforated casings is to have drilling fluids, such as mud, salt water, water, or oil, in the well casing and to perforate the casing with bullet, shaped charge or punch-type perforators. When the pressure of a formation traversed by the well exceeds the hydrostatic pressure of a column of oil or water at the completion depth, it is customary to use weighted salt water or normal drilling mud having a density great enough to exceed formation pressure in order to control the well while perforating the casing and performing other routine completion operations. In the case of a well filled with drilling mud when the casing is perforated the drilling mud flows into the perforations because of the pressure differential existing between the interior of the casing and the formation. The perforations are thereby partially or completely plugged with mud and this plugging is aggravated by the heat and instantaneous pressure evolved by the propellant power in the case of bullet perforators and the high explosive in the case of the jet or shaped charge perforators. Where punch-type perforators are employed, it is not uncommon for the drilling mud to lose water rapidly to the formation resulting in the drilling mud becoming dehydrated and forming plugs. Data are available which indicate that such plugs whether formed by dehydration of the drilling mud by heat, and/or pressure or by loss of water to the formation are difficult to remove by subsequent flow from the formation into the well bore and that the productivity of a perforating interval in a producing formation is significantly reduced. Field completion attempts of wells indicate that such plugging of the perforations may cause formations to be tested as being non-productive and thereby condemned when actually the formation may contain economically producible oil or gas. Thus it is clear that the problem of plugging of perforations is serious and is a source of expense in well completions and of erroneous conclusions in exploratory work which may cause major hydrocarbon reserves to remain undiscovered.

In accordance with my invention the problem of plugging perforations in a well casing in which a column of drilling mud is maintained to control a well is eliminated by providing in the well casing adjacent a producing formation a zone from which the drilling mud is removed or excluded and then perforating in said zone such that the drilling mud is not available to plug the perforations.

The present invention may, therefore, be briefly described as involving the exclusion from a zone in a well casing in which a column of drilling mud is maintained for control of the well, the drilling mud from the zone while perforating the casing in said well. In my invention, the drilling mud or fluid is excluded from the zone where perforation is to take place by replacing it with a fluid characterized as being of a density and/or of a viscosity such that the fluid replacing the drilling mud remains in the zone to be perforated unless removed earlier a sufficient length of time, at least 4 hours, to allow the well completion or servicing operations to be completed, including perforating the casing in said zone while the fluid remains in said zone. Thus in accordance with my invention the fluid which replaces the drilling mud in the casing is of such a character that it will not form plugs in the perforations which are not easily removable such as in the case of plugs formed by drilling mud.

I, therefore, employ in the zone in the casing to be perforated a fluid of sufficient weight and/or viscosity to prevent displacement by heavier muds above which will not plug the perforations or the formation perforated. The fluids that I employ are termed in the oil industry as gels and may be described as involving heavy metal soaps in admixture with hydrocarbons, such as fuel oil, crude oil and lighter fractions of fluid petroleum, as may be desired. To provide the necessary weight to the fluid or gel as it may be termed it may be desirable to admix intimately with the gel when formed a finely divided material, such as sand and the like, to provide the necessary weight thereto. It is contemplated that the weight of the fluid replacing the drilling fluid should range from 9 to 18 pounds per gallon. Of course, the weight of the fluid should be heavier than the weight of the drilling mud in order to displace the latter. The viscosity of the fluid replacing the drilling mud should range from about 10 to 4000 centipoises at 60° F. I also contemplate employing the so-called gel acid which is also used in the industry in various ways. For example, gels prepared with Napalm and kerosene or crude oil and weighted with sand may suitably be used. Gel-acid weighted with sand is another material which may be employed in my invention. Still another suitable material includes the plastic group of organic compounds which have the property of reverting to a non-viscous condition through the action of chemicals which may be added during the preparation or may break automatically with time or with adjustment of temperature and pressure. French Patent No. 987,352, granted April 11, 1951, sets out in detail many fluids which will fill my requirements as set out above. For example in the French patent supra it is mentioned that polymers, plasticizers soluble in petroleum or water, such as oxidized resins or bitumen, may be used and also natural or synthetic rubber as well as the resins such as polyacrylates. Mention is also made in the French patent supra of many heavy metal soaps which may be used in the formation of such gels. These fluids have the property of not forming plugs in perforations or in the formations with which they may come into contact.

In accordance with my invention, I prevent the aforementioned plugging of perforations and/or formations by placing a weighted jelly-like material in the well casing or blank liner, as the case may be, prior to perforating said casing or liner by conventional gun perforators or punch-type perforators. The jelly-like material displaces and/or excludes normal drilling fluids from the interval to be perforated during the perforating procedure and subsequent routine completion operations until efforts are made to establish flow from the formation into the well bore to determine and test the fluid content of the formation. Thus to accomplish this objective the material located in the casing to be perforated must be more dense and/or more viscous than the drilling fluid being employed and must not have any plugging effect during the perforating procedure or when in contact with formation fluids and it must have the property of being easily removed to permit subsequent production of oil or gas.

The present invention will be further illustrated by reference to the drawing in which the single figure illustrates the steps of a preferred mode.

Referring now to the drawing, numeral 11 designates a well bore in which a casing 12 is arranged and sealed by a sheath of cement 13. The casing 12 is provided with a casing seat 14 at its lower end and sealed off by cement 15. It is contemplated that cement may have been removed from the casing 12 except for the seal 15 by drilling out. In any event, the casing 12 is sheathed with cement 13 and sealed at the bottom also with cement as shown. The casing 12 in step 1 of my invention is filled with drilling mud indicated by numeral 16 and likewise the tubing 17 or drill pipe is also filled with drilling mud. It will be noted that the casing 12 traverses a formation A from which production is desired. Ordinarily the tubing string 17 or drill pipe would be removed and the interval designated by A of the producing formation would then be perforated. Prior to the present invention a well such as 11 would be held under control where the formation pressure was high by maintaining the column of drilling mud 16 in the well. Prior to the present invention, when the casing 10 was perforated the drilling mud would flow into the perforations and result in plugging thereof.

Accordingly in my invention in step 2 thereof, as shown in the drawing, a portion of the drilling mud 16 in the casing 12 is replaced by a body of a heavy and/or viscous fluid which is characterized by the property of not being displaced by the drilling mud. This material may be termed a gel and is shown as a body extending 50 to 500 feet beyond the limits of the formation A. This body of gel is indicated generally by numeral 18. The gel is arranged in the well casing 12 by pumping it down the tubing 17 or drill pipe which may be filled with the gel or which may have another fluid above the column of gel which remains in the tubing 17 above the body 18.

After the body 18 of gel has been located in the producing formation to form a zone or area encompassing or enclosing the area in the casing 12 traversing the formation A, the tubing string 17 may be removed and a perforator, such as a gun or shaped charge perforator 22, or similar device on a wire line 19 or electric cable is lowered in the casing 12. The shaped charge perforator 22 which is well known to the art is then fired to cause a jet or jets of molten metal to be jetted through the casing 12 to form perforations 20 in the casing 12 and to extend into the formation A as in 21. By virtue of firing the charges in the shaped charge perforator 22 the gel 18 in the casing 12 flows through the perforations 20 and into the fractures or cavity 21 thus excluding or preventing any drilling mud from flowing through the perforations or into the fractures or openings caused by the shooting of the gun perforator and the like. Thereafter the drilling mud 16 above the body of gel 18 is circulated out of the hole as is well known technique and any gel which remains in the fractures 21 or the perforations 20 will within about 24 hours revert to its component parts of a less viscous nature than the gel and will be circulated out of the fracture by production from formation A.

As shown in step 4 of my invention the tubing 17 is then lowered back into the casing 12 and production obtained up the tubing string 17; the flow from the fractures 21 is indicated generally by the arrows.

Thus in accordance with the present invention, it will be clear that I have devised a simple, readily adaptable process wherein plugging of perforations is eliminated by excluding from the zone in which perforating operations are conducted in a casing the drilling mud which is employed to control a well and replacing the drilling mud by a material which is characterized by not forming plugs and being easily removed.

The nature and objects of the present invention having been completely described and illustrated, what I wish to claim as new and useful and to secure by Letters Patent is:

1. A method for completing a well traversing a producing formation while maintaining said well under control with a fluid column having a hydrostatic pressure in excess of the formation pressure which comprises displacing only a portion of drilling fluid in a well casing to be perforated with a clean liquid having a weight in the range between 9 and 18 pounds per gallon, said liquid being heavier than the drilling fluid, inserting a casing perforator into the liquid, and perforating the casing in the liquid, said liquid being free of materials which might plug the perforations.

2. A method for completing a well traversing a proweight in the range between 9 and 18 pounds per gallon and a viscosity in the range between 10 and 4,000 centipoises at 60° F., said liquid being heavier than the drilling fluid and being capable of reverting to a liquid of reduced viscosity after a period of time at least 4 hours in the well, inserting a casing perforator into the liquid, and perforating the casing in the liquid, said liquid being free of materials which might plug the perforations in said casing.

3. A method for completing a well traversing a producing formation while maintaining said well under control with a fluid column having a hydrostatic pressure in excess of the formation pressure which comprises displacing only a portion of drilling fluid in a well casing to be perforated with a clean, high viscosity, gelled liquid, said liquid being heavier than the drilling fluid and being capable of reverting to a liquid of reduced viscosity after a period of time in the well, inserting a casing perforator into the gelled liquid, and perforating the casing in the gelled liquid, said liquid being free of materials which might plug the perforations in said casing.

4. A method for completing a well traversing a producing formation while maintaining said well under control with a fluid column having a hydrostatic pressure in excess of the formation pressure which comprises displacing only a portion of drilling fluid in a well casing to be perforated with a clean, high viscosity, gelled liquid, said liquid being heavier than the drilling fluid and being capable of reverting to a liquid of reduced viscosity after a period of time at least 4 hours in the well, inserting a casing perforator into the gelled liquid, perforating the casing in the gelled liquid, and producing said well from the producing formation through the perforated casing, said liquid being free of materials which might plug the perforations in said casing.

5. A method for completing a well traversing a producing formation while maintaining said well under control with a fluid column having a hydrostatic pressure in excess of the formation pressure which comprises displacing only a portion of drilling fluid in a well casing to be perforated with a clean, high viscosity gelled liquid, said liquid being heavier than the drilling fluid and being capable of reverting to a liquid of reduced viscosity after a period of time at least four hours in the well, inserting a gun perforator into the gelled liquid, perforating the casing in the gelled liquid by shooting said gun perforator, and producing said well from the producing formation through the perforated casing, said liquid being free of materials which might plug the perforations in said casing.

6. A method for completing a well traversing a producing formation while maintaining said well under control with a fluid column having a hydrostatic pressure in excess of the formation pressure which comprises displacing only a portion of drilling fluid in a well casing to be perforated with a clean, acid gel liquid, said liquid being heavier than the drilling fluid and being capable of reverting to a liquid of reduced viscosity after a period of time at least four hours in the well, inserting a casing gun perforator into the gelled liquid, perforating the casing in the gelled liquid by shooting said gun perforator, and producing said well from the producing formation through the perforated casing, said liquid being free of materials which might plug the perforations in said casing.

7. A method for completing a well traversing a producing formation while maintaining said well under control with a fluid column having a hydrostatic pressure in excess of the formation pressure which comprises displacing only a portion of drilling fluid in a well casing adjacent the point where said well traverses said producing formation with a clean, viscous liquid having a weight in the range between 9 and 18 pounds per gallon and a viscosity in the range between 10 and 4,000 centipoises at 60° F., said liquid being heavier than the drilling fluid and being capable of reverting to a liquid of reduced viscosity after a period of time at least four hours in the well, inserting a casing gun perforator into the liquid, firing said gun perforator to form perforations in said casing, removing the liquid from the casing, and producing said well from the producing formation through the perforated casing, said liquid being free of materials which might plug the perforations in said casing.

8. A method in accordance with claim 7 in which the liquid is an acid gel.

9. A method in accordance with claim 7 in which the liquid is a gelled liquid.

10. A method for completing a well traversing a producing formation while maintaining said well under control with a fluid column having a hydrostatic pressure in excess of the formation pressure which comprises displacing only a portion of drilling fluid in a well casing to be perforated with a high viscosity liquid, said liquid being heavier than and having the property of excluding drilling fluid from the area of the well casing to be perforated and being capable of reverting to a liquid of reduced viscosity after a period of time in the well, inserting a casing perforator in the liquid, and perforating the casing in the liquid, said liquid being easily removable from the perforations in said casing and from the formation without forming plugs in the perforations and formation.

References Cited in the file of this patent

UNITED STATES PATENTS

| Number | Name | Date |
|---|---|---|
| 2,316,596 | Kennedy | Apr. 13, 1943 |
| 2,379,516 | Garrison | July 3, 1945 |
| 2,494,256 | Muskat et al. | Jan. 10, 1950 |
| 2,530,966 | Huber | Nov. 21, 1950 |
| 2,596,137 | Fast | May 13, 1952 |
| 2,596,844 | Clark | May 13, 1952 |